US012738622B1

(12) United States Patent
Carley et al.

(10) Patent No.: US 12,738,622 B1
(45) Date of Patent: Sep. 15, 2026

(54) METHOD FOR CONNECTING MEMORY DEVICE THROUGH HEMP/EMI PROTECTED BARRIER

(71) Applicant: Raytheon Company, Arllington, VA (US)

(72) Inventors: Ryan William Carley, Hopkinton, MA (US); Michael L. Mcfeeters, Wilmington, MA (US); Kimberly C. Mann, Worcester, MA (US); John B. Rivera-Poventud, Clinton, MA (US)

(73) Assignee: Raytheon Company, Arlington, VA (US)

( * ) Notice: Subject to any disclaimer, the term of this patent is extended or adjusted under 35 U.S.C. 154(b) by 427 days.

(21) Appl. No.: 18/444,274

(22) Filed: Feb. 16, 2024

(51) Int. Cl.
*H01P 5/08* (2006.01)
*H01P 3/12* (2006.01)
*H01P 3/127* (2006.01)

(52) U.S. Cl.
CPC ................ *H01P 5/08* (2013.01); *H01P 3/121* (2013.01); *H01P 3/127* (2013.01)

(58) Field of Classification Search
CPC ................................ H01P 3/121; H01P 3/127
See application file for complete search history.

(56) References Cited

U.S. PATENT DOCUMENTS 2,752,440 A 6/1956 Robbins
2,968,710 A 1/1961 Horberg, Jr.
4,962,358 A 10/1990 Svetanoff
5,153,524 A 10/1992 McCormack
5,289,347 A 2/1994 McCarthy et al.
5,391,083 A 2/1995 Roebuck et al.
5,711,679 A 1/1998 Spickler et al.
5,920,064 A 7/1999 Rogers
5,941,725 A 8/1999 Brennan et al.
6,174,176 B1 1/2001 Hong
6,295,410 B1 9/2001 Helms et al.
6,384,357 B1 * 5/2002 Morrison ............. H01H 19/115 200/520
6,682,368 B2 1/2004 Murr et al.
7,479,042 B2 1/2009 Chen
8,217,739 B2 7/2012 Wu
9,124,956 B2 9/2015 Heimann et al.
(Continued)

FOREIGN PATENT DOCUMENTS

CN 108562767 A 9/2018
DK 3707792 T2 9/2023
(Continued)

OTHER PUBLICATIONS

William Radasky et al. "High-Frequency Protection Concepts for the Electric Power Grid", Metatech Corporation, 358 S. Fairview Ave., Suite E, Goleta, CA 93117, Jan. 2010.

*Primary Examiner* — Tung X Nguyen
(74) *Attorney, Agent, or Firm* — Suiter Swantz IP

(57) ABSTRACT

An electronic interface includes a metallic tube that functions as a waveguide below cutoff (WBC). A non-conductive rod inside the metallic tube may be manipulated to engage a connection device to the interface, within a shielded enclosure. The metallic tube defines a locating recess and the non-conductive wand defines a keying/pulling feature to engage the locating recess. The keying/pulling feature may orient the non-conductive wand to facilitate the connection device engaging the interface.

20 Claims, 2 Drawing Sheets

(56) References Cited

U.S. PATENT DOCUMENTS

| | | | |
|---|---|---|---|
| 9,190,837 B2 | 11/2015 | Tollefsbol et al. | |
| 11,350,548 B2 | 5/2022 | Easton et al. | |
| 11,450,990 B2 | 9/2022 | Demaratos et al. | |
| 11,749,950 B2 | 9/2023 | Chen et al. | |
| 2005/0128741 A1 | 6/2005 | Matthews et al. | |
| 2005/0181645 A1 | 8/2005 | Ni et al. | |
| 2010/0216398 A1 | 8/2010 | Finn et al. | |
| 2014/0209438 A1* | 7/2014 | Wavering | H01H 9/286<br>200/43.21 |
| 2015/0173255 A1 | 6/2015 | Manto et al. | |
| 2016/0141584 A1 | 5/2016 | Eichorn | |
| 2017/0346322 A1 | 11/2017 | Kuran et al. | |
| 2022/0201907 A1 | 6/2022 | Trent | |
| 2022/0201908 A1 | 6/2022 | Boyd et al. | |
| 2022/0412077 A1 | 12/2022 | Ford et al. | |
| 2023/0216132 A1 | 7/2023 | Guo et al. | |

FOREIGN PATENT DOCUMENTS

| | | |
|---|---|---|
| EP | 0106432 A1 | 4/1984 |
| EP | 3051634 B1 | 1/2020 |
| KR | 101316542 B1 | 10/2013 |

* cited by examiner

METHOD FOR CONNECTING MEMORY DEVICE THROUGH HEMP/EMI PROTECTED BARRIER

BACKGROUND

Designing enclosures to meet High Altitude Electromagnetic Pulse (HEMP) requirements usually requires filters at all copper signal penetrations. These filters add weight and size to the system and require periodic testing. They also increase susceptibility to the effects of HEMP. However, there is often a need to be able to send data via copper interfaces across the enclosure barrier.

SUMMARY

In one aspect, embodiments of the inventive concepts disclosed herein are directed to an electronic interface having a metallic tube that functions as a waveguide below cutoff (WBC). A non-conductive rod inside the metallic tube may be manipulated to engage a connection device to the interface, within a shielded enclosure.

In a further aspect, the metallic tube defines a locating recess and the non-conductive wand defines a keying/pulling feature to engage the locating recess. The keying/pulling feature may orient the non-conductive wand to facilitate the connection device engaging the interface.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
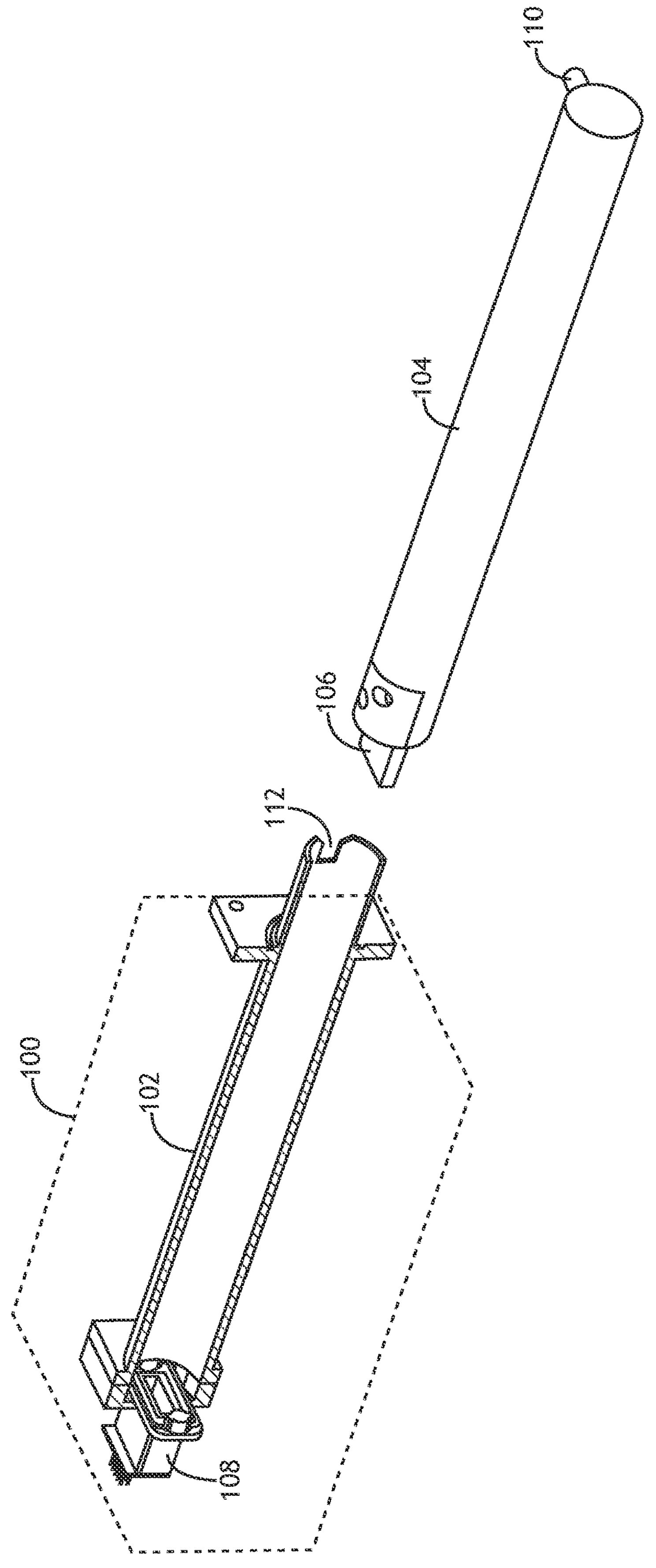
FIG. 1 shows a perspective, cross-sectional view of a memory device interface according to an exemplary embodiment.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, “or” refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of “a” or “an” are employed to describe elements and components of embodiments of the instant inventive concepts. This is done merely for convenience and to give a general sense of the inventive concepts, and “a” and “an” are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to “one embodiment,” or “some embodiments” means that a particular element, feature, structure, or characteristic described in connection with the embodiment is included in at least one embodiment of the inventive concepts disclosed herein. The appearances of the phrase “in at least one embodiment” in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed an electronic interface having a metallic tube that functions as a waveguide below cutoff (WBC). A non-conductive rod inside the metallic tube may be manipulated to engage a connection device to the interface, within a shielded enclosure. The metallic tube defines a locating recess and the non-conductive wand defines a keying/pulling feature to engage the locating recess. The keying/pulling feature may orient the non-conductive wand to facilitate the connection device engaging the interface.

Referring to FIG. 1, a perspective, cross-sectional view of a memory device interface according to an exemplary embodiment is shown. A shielded enclosure 100 may require periodic interface with an external connection such as a with a memory device, datalink cable, charging cable, or the like. A suitable interface 108, if disposed on a surface of the enclosure 100, would compromise the enclosure 100.

In at least one embodiment, the device interface comprises a metallic tube 102 extending from an open terminus at an external wall of the shielded enclosure 100 to an interface terminus at some location within the shielded enclosure 100. The suitable interface 108 is disposed at the interface terminus, oriented to receive a connection device (e.g., a memory device, cable, power feed, or the like) inserted into the open terminus of the metallic tube 102.

In at least one embodiment, a memory device 106 or other connection device may be disposed in a non-conductive wand 104 configured to be inserted into the metallic tube 102. The non-conductive wand 104 places the connection device on an axis to engage the interface 108 upon insertion, and allow the connection device to actually reach and engage the interface.

In at least one embodiment, the non-conductive wand 104 may comprise a keying/pulling feature 110. The keying/pulling feature 110 may be disposed to engage a locating recess 112 defined by the metallic tube 102. In at least one embodiment, the open terminus of the metallic tube may define angled features biased toward the locating recess 112 to engage the keying/pulling feature 110, and force the non-conductive wand 104 to turn while being inserted into the metallic tube 102 such that the keying/pulling feature is automatically aligned to the locating recess 112. Such features ensure that the connection device and interface are properly aligned when the non-conductive wand 104 is inserted.

In at least one embodiment, the metallic tube 102 comprises a Waveguide Below Cutoff (WBC), configured to attenuate electromagnetic pulse threat signals. At least a portion of the non-conductive wand 102 must be non-metallic. A WBC is a metallic waveguide that's primary purpose is to attenuate electromagnetic waves at frequencies below the cutoff frequency rather than propagating waves at frequencies above cutoff. The cutoff frequency is determined by the transverse dimensions and geometry of the waveguide and properties of any dielectric material passing through the waveguide.

Figure 2:
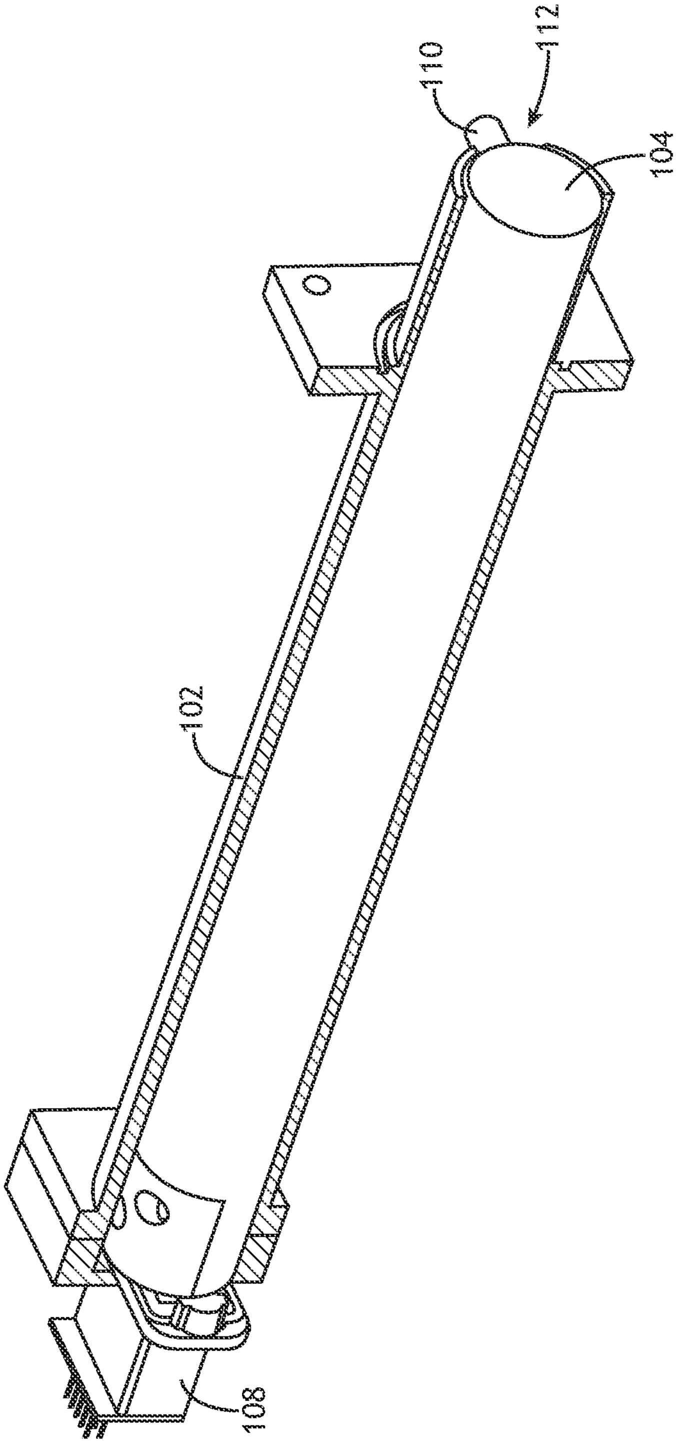
FIG. 2 shows a perspective, cross-sectional view of a memory device interface according to an exemplary embodiment.

Referring to FIG. 2, a perspective, cross-sectional view of a memory device interface according to an exemplary embodiment is shown. When a shielded enclosure 100 such as in FIG. 1 receives a connector disposed on a non-conductive want 104, the non-conductive wand 104 is fully inserted in the metallic tube 102 and potentially rotated via the engagement of a keying/pulling feature 110 and a locating recess 112.

Embodiments enable a shielded enclosure to have a copper electrical/electronic interface that does not require filtering for the threat effects of HEMP. The integrated WBC in the chassis attenuates any external signal before it reaches the connector interface. When the electronic device on the non-conductive wand is installed, it protects the system in the same way. The length of the non-metallic portion of the non-conductive wand ensures the integrity of the WBC from external HEMP threats.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. An electronic interface comprising:

a metallic tube;

an electronic interface element disposed at an interface terminus of the metallic tube;

a non-conductive rod configured to translate within the metallic tube; and wherein the non-conductive rod is configured to receive a connection device at an insertion terminus such that the connection device engages the electronic interface element when the non-conductive want is inserted into the metallic tube.

2. The electronic interface of claim 1, wherein the connection device comprises a solid-state memory device.

3. The electronic interface of claim 1, wherein:

the metallic tube defines a locating recess;

the non-conductive wand comprises a keying/pulling feature; and the keying/pulling feature is configured to engage the locating recess when the non-conductive wand is inserted into the metallic tube.

4. The electronic interface of claim 3, wherein metallic tube further defines angled features configured to engage the keying/pulling feature and turn the non-conductive wand to orient the keying/pulling feature toward the locating recess.

5. The electronic interface of claim 4, wherein the connection device comprises a solid-state memory device.

6. The electronic interface of claim 1, wherein the connection device comprises a power transfer element.

7. The electronic interface of claim 1, wherein the metallic tube comprises a waveguide below cutoff.

8. A shielded enclosure comprising:

an electronic interface disposed at a wall of the shielded enclosure comprising:

a metallic tube;

an electronic interface element disposed at an interface terminus of the metallic tube;

a non-conductive rod configured to translate within the metallic tube; and wherein the non-conductive rod is configured to receive a connection device at an insertion terminus such that the connection device engages the electronic interface element when the non-conductive want is inserted into the metallic tube.

9. The shielded enclosure of claim 8, wherein the connection device comprises a solid-state memory device.

10. The shielded enclosure of claim 8, wherein:

the metallic tube defines a locating recess;

the non-conductive wand comprises a keying/pulling feature; and the keying/pulling feature is configured to engage the locating recess when the non-conductive wand is inserted into the metallic tube.

11. The shielded enclosure of claim 10, wherein metallic tube further defines angled features configured to engage the keying/pulling feature and turn the non-conductive wand to orient the keying/pulling feature toward the locating recess.

12. The shielded enclosure of claim 11, wherein the connection device comprises a solid-state memory device.

13. The shielded enclosure of claim 8, wherein the connection device comprises a power transfer element.

14. The shielded enclosure of claim 8, wherein the metallic tube comprises a waveguide below cutoff.

15. A device including a HEMP enclosure comprising:

an electronic interface comprising:

a metallic tube;

an electronic interface element disposed at an interface terminus of the metallic tube;

a non-conductive rod configured to translate within the metallic tube; and wherein:

the non-conductive rod is configured to receive a connection device at an insertion terminus such that the connection device engages the electronic interface element when the non-conductive want is inserted into the metallic tube; and the metallic tube comprises a waveguide below cutoff.

16. The device of claim 15, wherein the connection device comprises a solid-state memory device.

17. The device of claim 15, wherein:

the metallic tube defines a locating recess;

the non-conductive wand comprises a keying/pulling feature; and the keying/pulling feature is configured to engage the locating recess when the non-conductive wand is inserted into the metallic tube.

18. The device of claim 17, wherein metallic tube further defines angled features configured to engage the keying/pulling feature and turn the non-conductive wand to orient the keying/pulling feature toward the locating recess.

19. The device of claim 18, wherein the connection device comprises a solid-state memory device.

20. The device of claim 15, wherein the connection device comprises a power transfer element.

* * * * *